(12) United States Patent
Lin et al.

(10) Patent No.: US 12,208,478 B2
(45) Date of Patent: Jan. 28, 2025

(54) POSITIONING DEVICE

(71) Applicants: Chang-Yi Lin, Taichung (TW);
Chang-Chih Lin, Taichung (TW)

(72) Inventors: Chang-Yi Lin, Taichung (TW);
Chang-Chih Lin, Taichung (TW)

( * ) Notice: Subject to any disclaimer, the term of this patent is extended or adjusted under 35 U.S.C. 154(b) by 328 days.

(21) Appl. No.: 17/873,614

(22) Filed: Jul. 26, 2022

(65) Prior Publication Data
US 2024/0033865 A1    Feb. 1, 2024

(51) Int. Cl.
*B23Q 1/00* (2006.01)
(52) U.S. Cl.
CPC .................................. *B23Q 1/009* (2013.01)
(58) Field of Classification Search
CPC . B23Q 3/00; B23Q 3/164; B23Q 3/10; B23Q 3/167; B23Q 3/067; B23Q 3/04; B23Q 1/25; B23Q 1/00; B23Q 1/009
See application file for complete search history.

(56) References Cited

U.S. PATENT DOCUMENTS

| | | | | |
|---|---|---|---|---|
| 3,589,237 | A * | 6/1971 | Strohecker | B23C 1/06 409/199 |
| 8,246,029 | B2 * | 8/2012 | Kawakami | B23Q 17/006 269/37 |
| 2003/0071407 | A1 * | 4/2003 | Haruna | B23Q 1/0081 269/309 |
| 2006/0186591 | A1 * | 8/2006 | Yonezawa | B23B 31/1071 269/309 |
| 2015/0054211 | A1 * | 2/2015 | Hediger | B23Q 17/005 269/309 |
| 2015/0321302 | A1 * | 11/2015 | Kawakami | B23Q 3/18 269/309 |
| 2024/0033865 | A1 * | 2/2024 | Lin | B23Q 1/0072 |

FOREIGN PATENT DOCUMENTS

TW    I720854    3/2021

* cited by examiner

*Primary Examiner* — Lee D Wilson
(74) *Attorney, Agent, or Firm* — MUNCY, GEISSLER, OLDS & LOWE, P.C.

(57) ABSTRACT

A positioning device is provided, including: a base seat, including a plurality through holes and a slide groove; a clamping assembly, disposed within the slide groove, including a first clamping body and a second clamping body; an adjustment assembly, including a first driving rod, a second driving rod and at least one rotation rod, the first driving rod including a first thread section and a first bevel gear, the second driving rod including a second thread section and a second bevel gear, the first clamping body and the second clamping body are respectively screwed on the first thread section and the second thread section, each rotation rod including a third bevel gear, the third bevel gear respectively meshed with the first bevel gear and the second bevel gear.

10 Claims, 9 Drawing Sheets

POSITIONING DEVICE

BACKGROUND OF THE INVENTION

Field of the Invention

The present invention relates to a positioning device.

Description of the Prior Art

A conventional positioning device, as shown in TW 1720854, discloses that a guide rod is screwed on a passage. The guide rod has a conical guide surface. The conical guide surface is axially moved to radially abut a plurality of balls to move a first blocking member and a second blocking member, so that a first insertion rod and a second insertion rod are respectively blocked by the first blocking member and the second blocking member.

However, the guide rod is in point-to-point contact with the plurality of balls, and the plurality of balls are in point-to-point contact with the first blocking member and the second blocking member. Therefore, the first blocking member and the second blocking member are respectively unevenly pushed, so as to easy sway. As a result, the first blocking member and the second blocking member cannot be smoothly moved and stably engaged with the first insertion rod and the second insertion rod.

The present invention is, therefore, arisen to obviate or at least mitigate the above-mentioned disadvantages.

SUMMARY OF THE INVENTION

The main object of the present invention is to provide a positioning device, including a first clamping body and a second clamping body which can be stably and evenly moved relative to each other.

To achieve the above and other objects, a positioning device is provided, being adapted for removably positioning a tooling fixture, the positioning device including: a base seat, including a plurality of through holes and a slide groove which extends in a first direction, the plurality of through holes being configured to receive a plurality of positioning pins which are connected with the tooling fixture; a clamping assembly, disposed within the slide groove, including a first clamping body and a second clamping body, the first clamping body and the second clamping body being respectively movable relative to each other and relative to at least one said through hole between a locking position and a release position in the first direction; and an adjustment assembly, including a first driving rod, a second driving rod and at least one rotation rod, the at least one rotation rod rotatably disposed within the base seat, the first driving rod and the second driving rod respectively rotatably disposed within the slide groove, the first driving rod including a first thread section and a first bevel gear connected with the first thread section, the second driving rod including a second thread section and a second bevel gear connected with the second thread section, the first clamping body screwed to the first thread section and the second clamping body screwed to the second thread section, each of the at least one rotation rod including a third bevel gear, the third bevel gear meshed with the first bevel gear and the second bevel gear, so that the first driving rod and the second driving rod are respectively rotated by the at least one rotation rod; wherein the first clamping body includes at least one first engaging portion, the second clamping body includes at least one second engaging portion; when the first clamping body and the second clamping body are respectively located in the locking position, the at least one first engaging portion and the at least one second engaging portion each is disposed through one of the plurality of through holes and engaged within a groove of one of the plurality of positioning pins.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
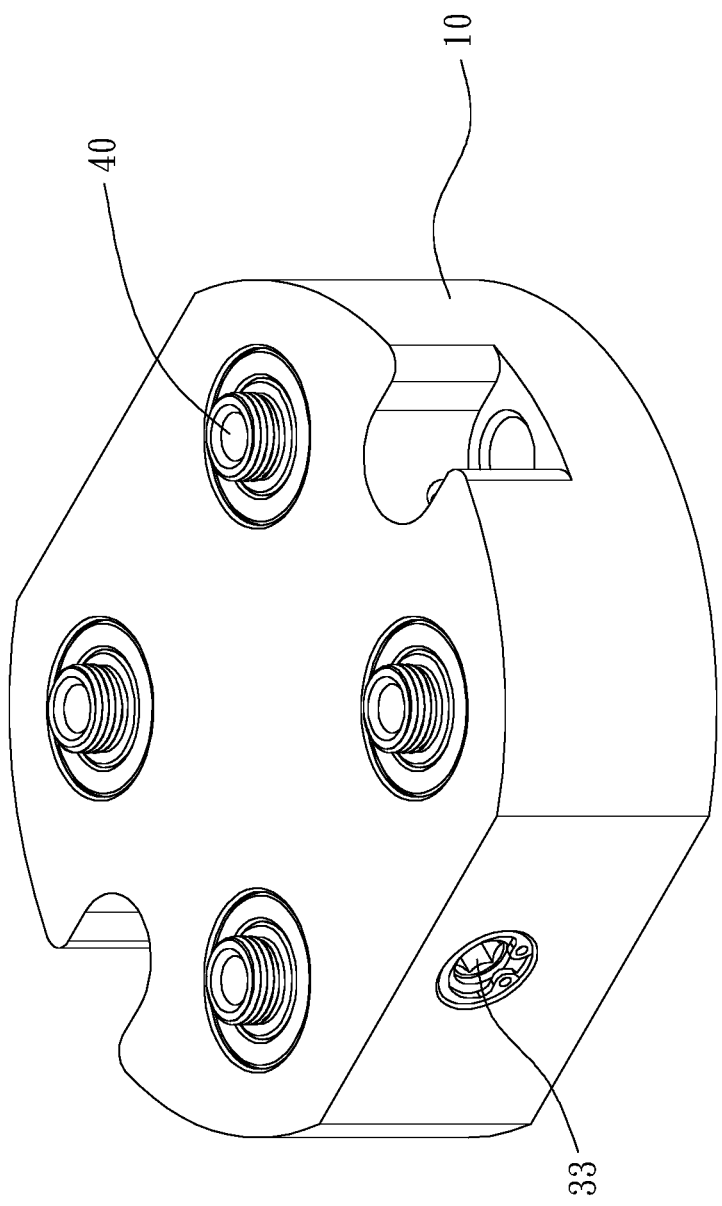
FIG. 1 is a stereogram of a preferable embodiment of the present invention.
Figure 2:
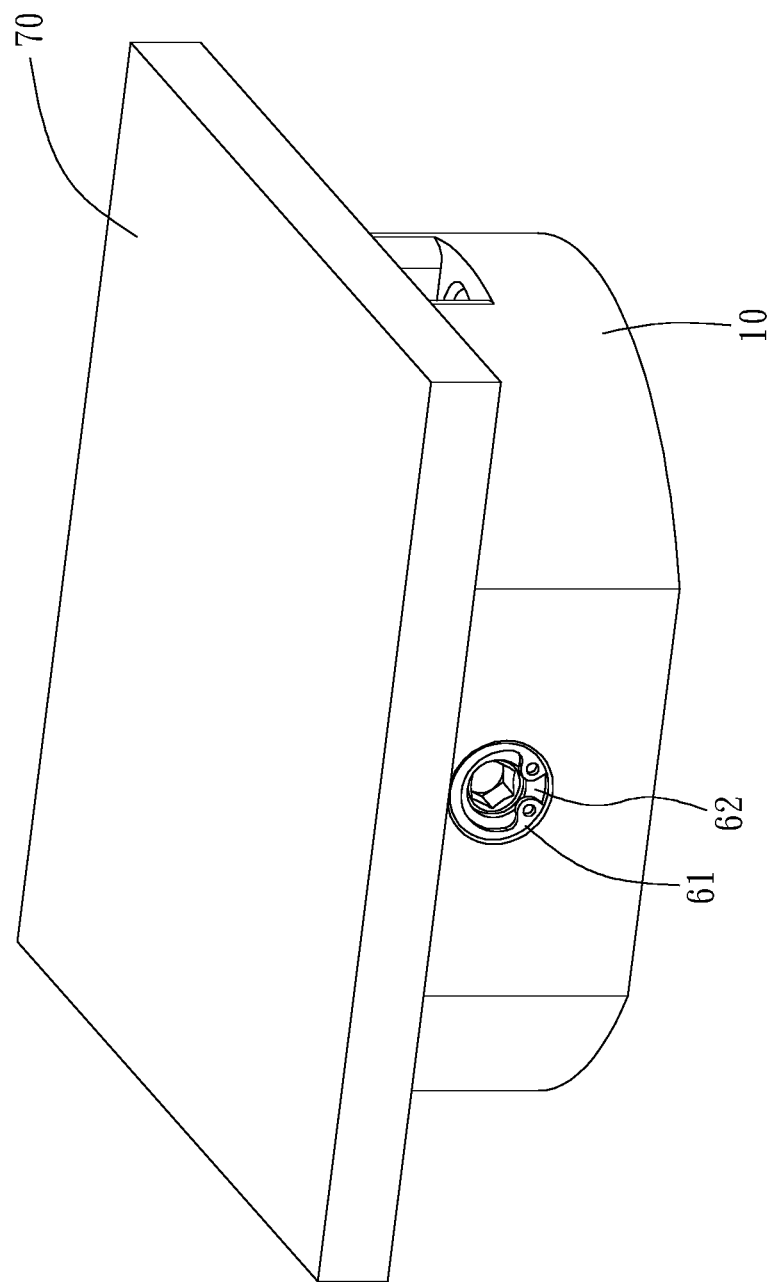
FIG. 2 is a stereogram of a tooling fixture secured to a base seat of the preferable embodiment of the present invention.
Figure 3:
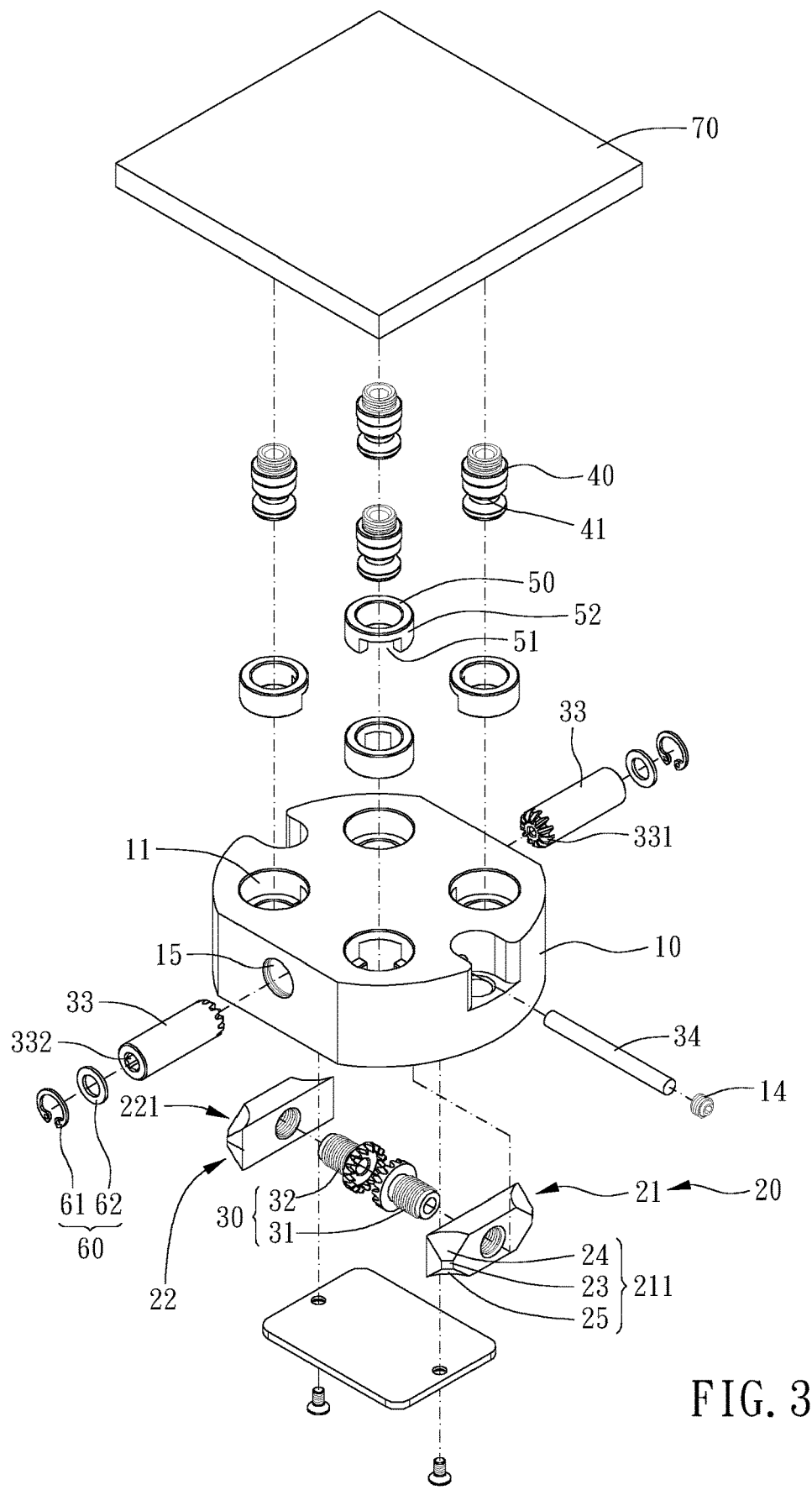
FIG. 3 is a breakdown drawing of the preferable embodiment of the present invention.
Figure 4:
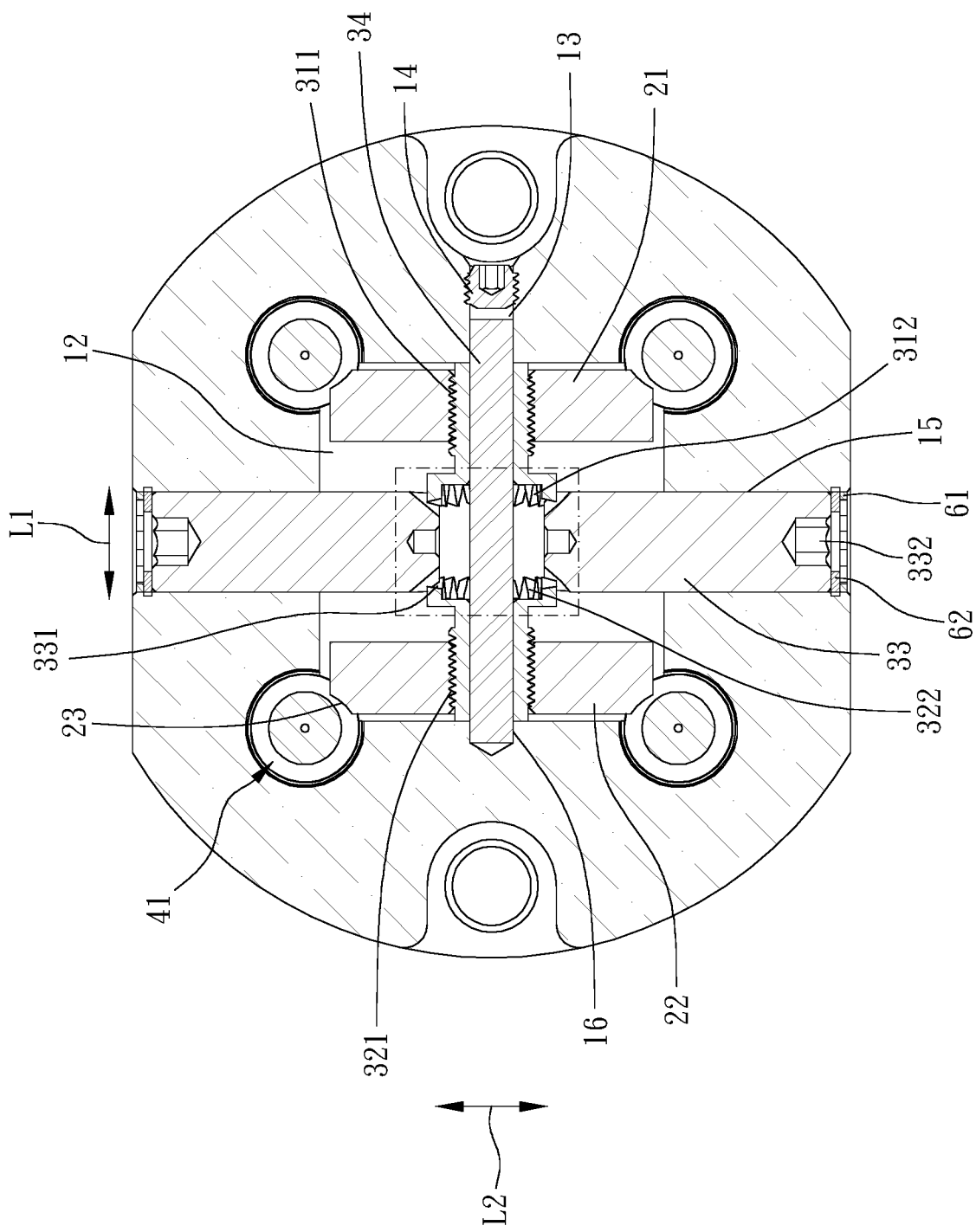
FIG. 4 is a cross-sectional view of the preferable embodiment of the present invention.
Figure 4A:
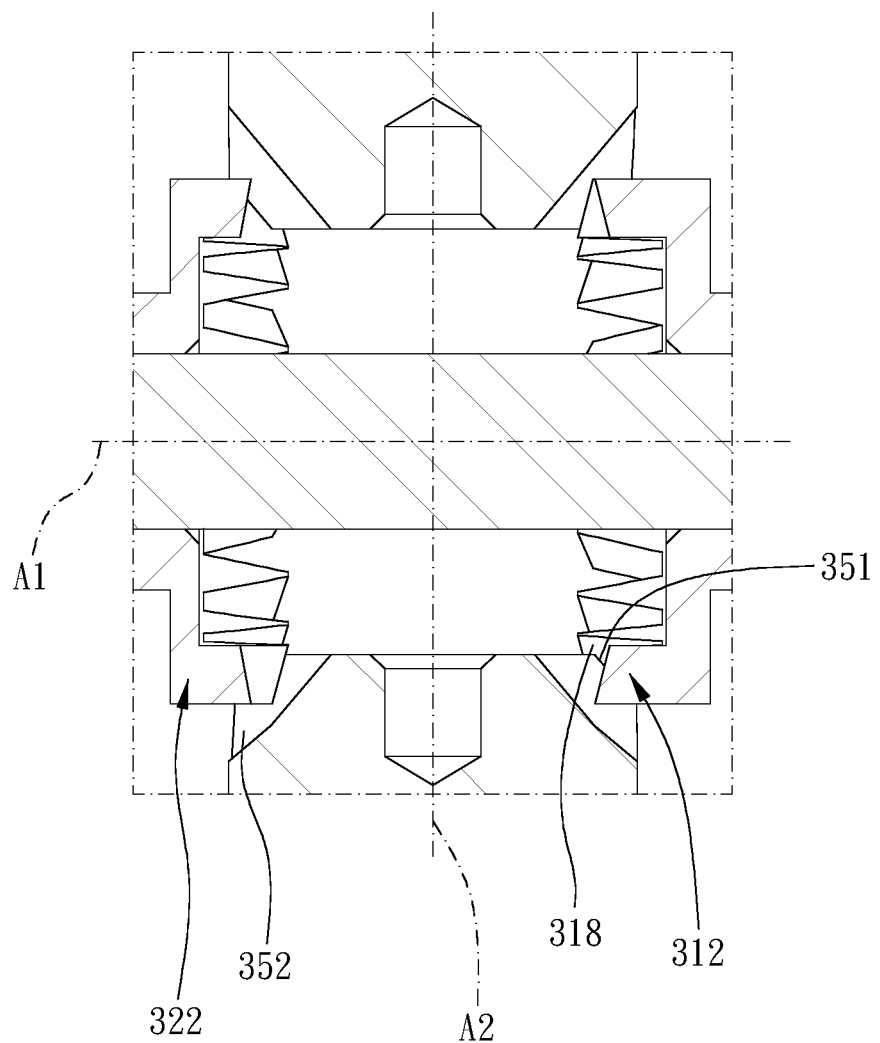
FIG. 4A is a partially enlarged view of FIG. 4.
Figure 5:
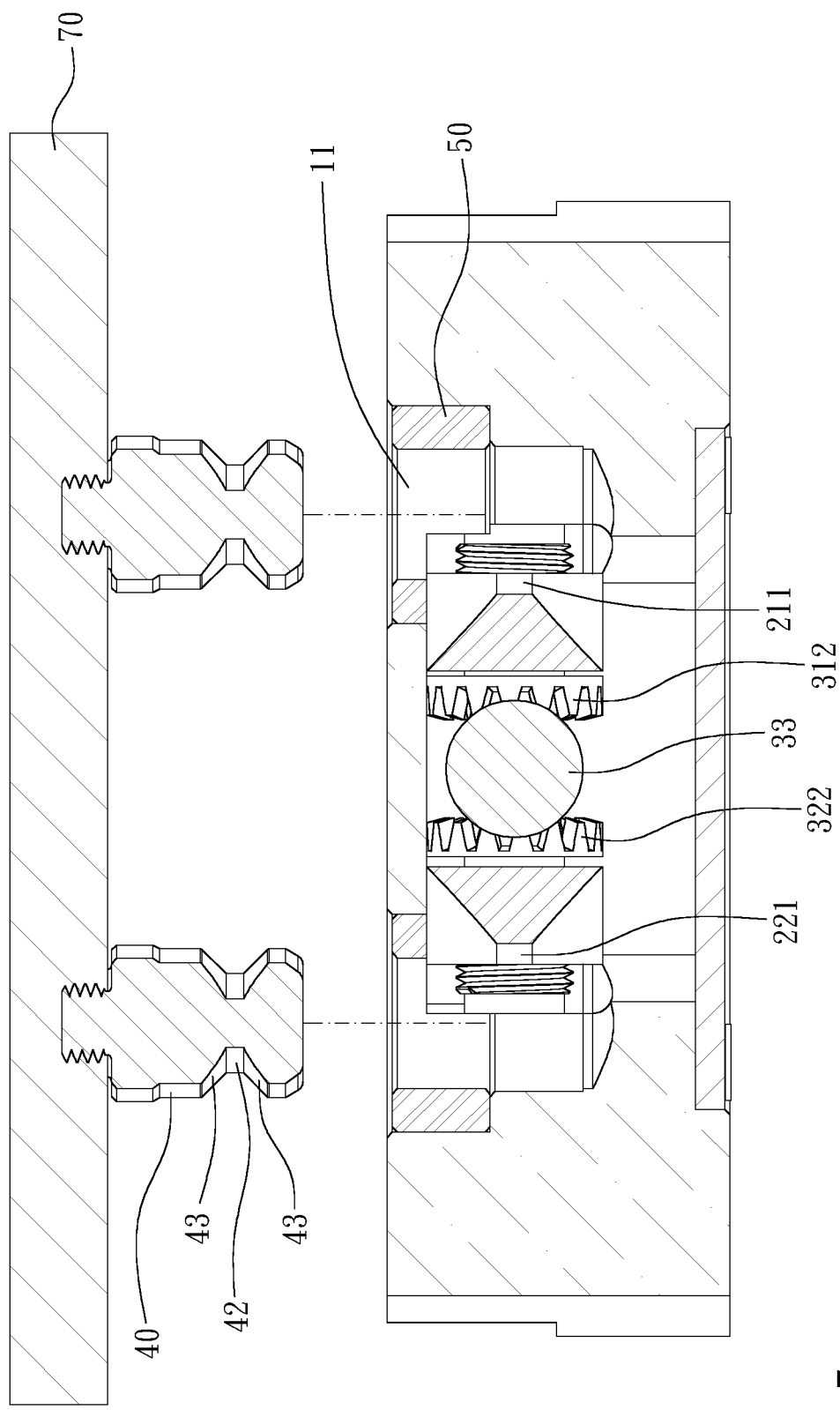
FIG. 5 is a cross-sectional breakdown view of the preferable embodiment of the present invention.
Figure 6:
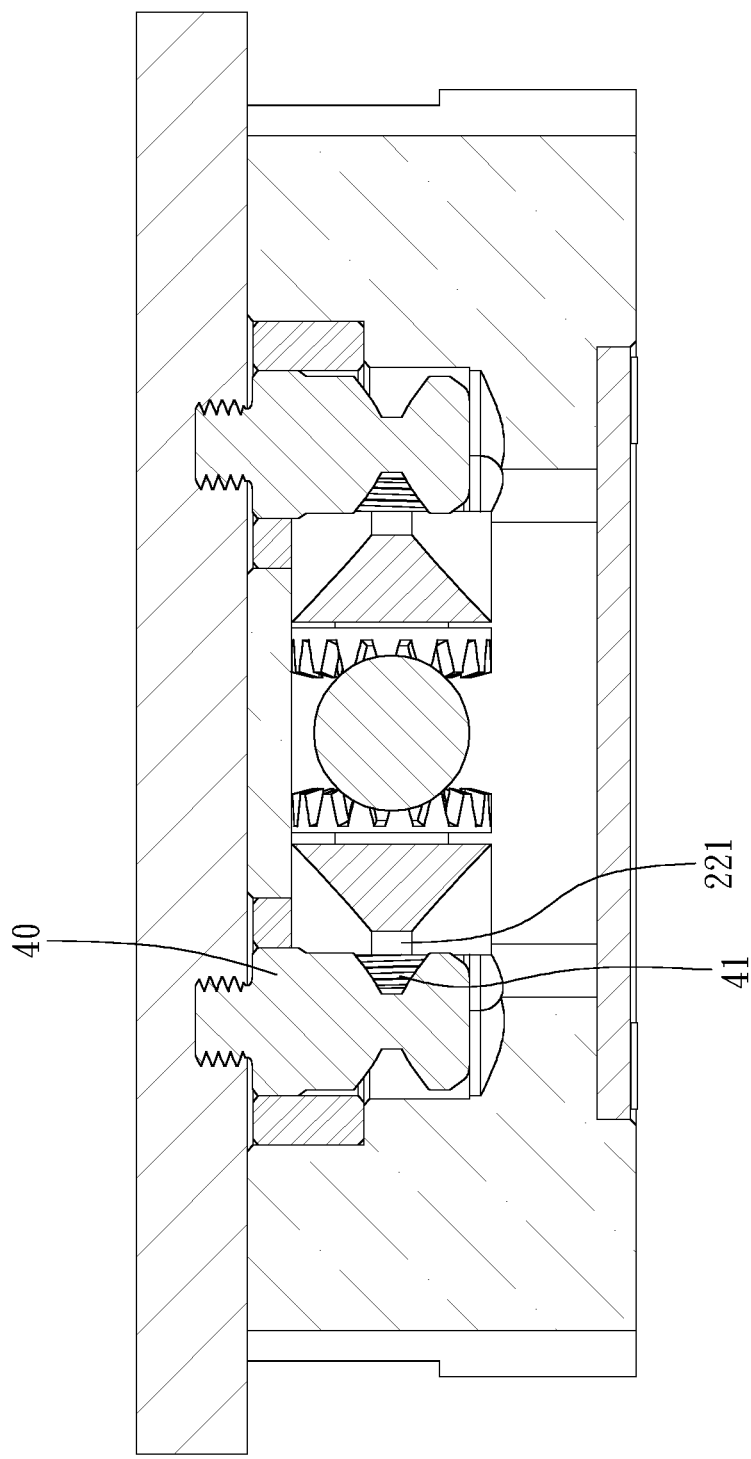
FIG. 6 is a cross-sectional breakdown view of a first clamping body and a second clamping body respectively located in a release position of the preferable embodiment of the present invention.
Figure 7:
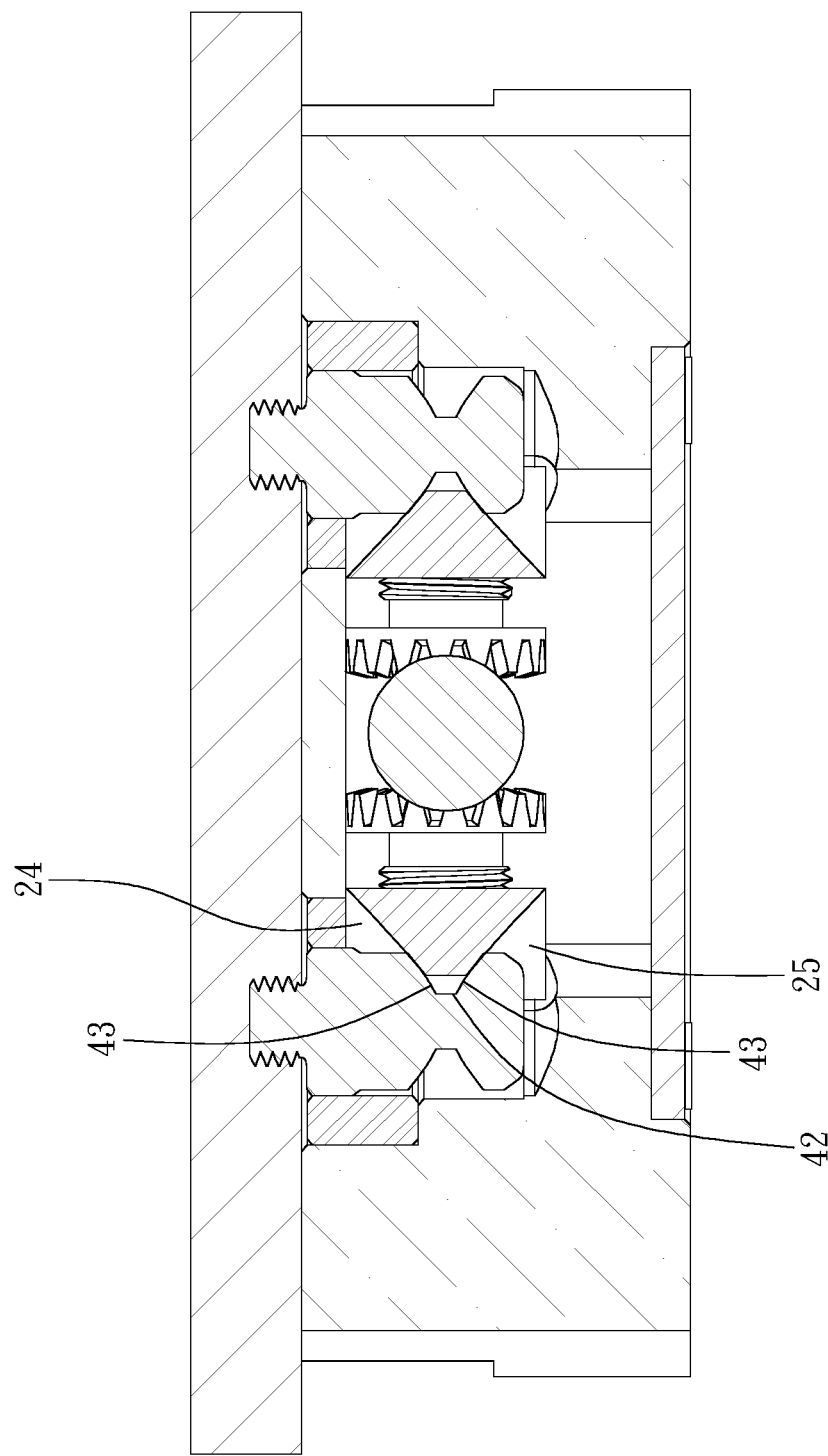
FIG. 7 is a cross-sectional breakdown view of the first clamping body and the second clamping body respectively located in a locking position of the preferable embodiment of the present invention.
Figure 8:
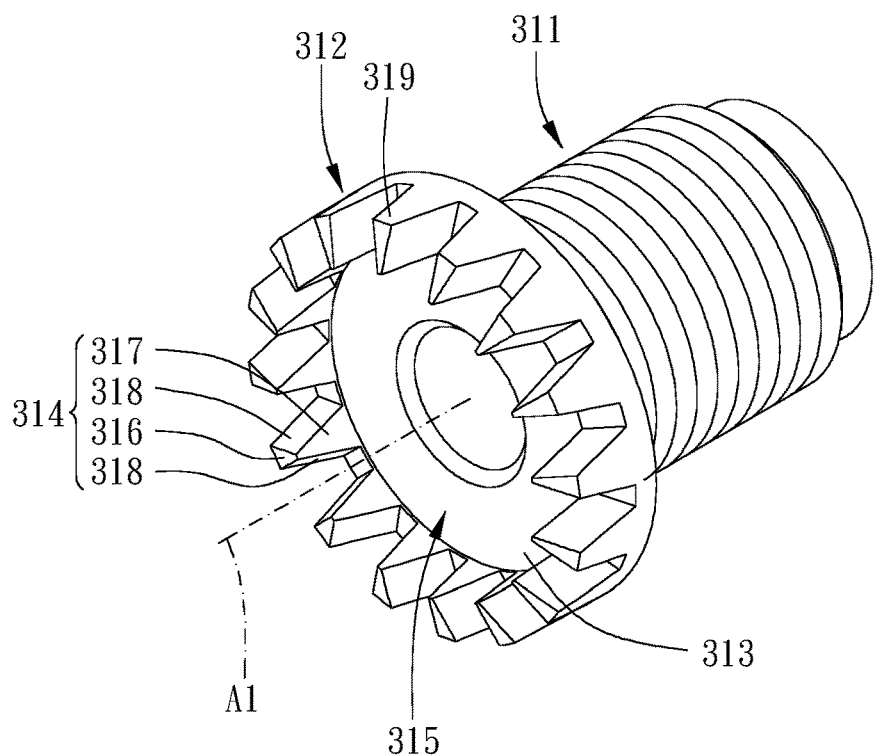
FIG. 8 is a stereogram of a first driving rod of the preferable embodiment of the present invention.
Figure 9:
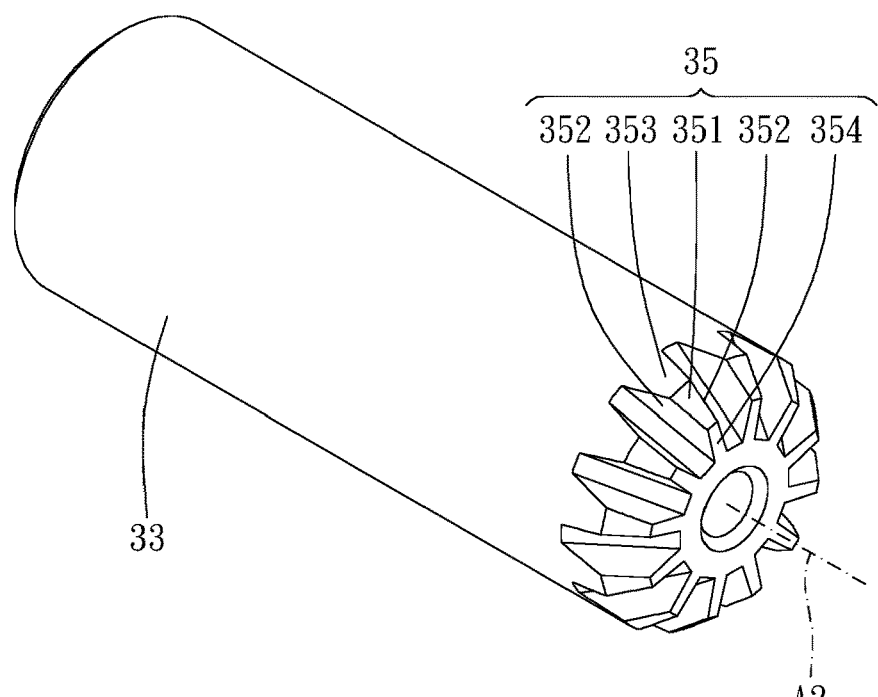
FIG. 9 is a stereogram of a rotation rod of the preferable embodiment of the present invention.

Please refer to FIGS. 1 to 9 for a preferable embodiment of the present invention. A positioning device of the present invention is adapted for removably positioning a tooling fixture 70, the positioning device includes a base seat 10, a clamping assembly 20 and an adjustment assembly 30.

The base seat 10 includes a plurality of through holes 11 and a slide groove 12 which extends in a first direction L1, the plurality of through holes 11 are configured to receive a plurality of positioning pins 40 which are connected with the tooling fixture 70. The clamping assembly 20 is disposed within the slide groove 12. The clamping assembly 20 includes a first clamping body 21 and a second clamping body 22. The first clamping body 21 and the second clamping body 22 are respectively movable relative to each other and relative to at least one said through hole 11 between a locking position and a release position in the first direction L1. The adjustment assembly 30 includes a first driving rod 31, a second driving rod 32 and at least one rotation rod 33. The at least one rotation rod 33 is disposed within the base seat 10. The first driving rod 31 and the second driving rod 32 are respectively rotatably disposed within the slide groove 12. The first driving rod 31 includes a first thread section 311 and a first bevel gear 312 connected with the first thread section 311, the second driving rod 32 includes a second thread section 321 and a second bevel gear 322 connected with the second thread section 321. The first clamping body 21 is screwed to the first thread section 311 and the second clamping body 22 is screwed to the second thread section 321, and each of the at least one rotation rod 33 includes a third bevel gear 331, the third bevel gear 331 is meshed with the first bevel gear 312 and the second bevel gear 322, so that the first driving rod 31 and the second driving rod 32 are respectively rotated by the at least one rotation rod 33. In this embodiment, the first thread section 311 and the second thread section 321 are respectively formed in opposite helical directions. Therefore, it provides the tooling fixture 70 to be quickly disengaged or engaged. Moreover, the first driving rod 31 is screwed to the first clamping body 21, and the second driving rod 32 to the second clamping body 22, to create a face-to-face contact. As a result, the first clamping body 21 and the second clamping body 22 are moved by evenly-applied force.

Besides, it can be changed a gear ratio between the third bevel gear 331 and the first bevel gear 312, and a gear ratio between the third bevel gear 331 and the second bevel gear 322, or a shape of at least one of the first bevel gear 312, the second bevel gear 322 and the third bevel gear 331 in accordance with an output torque, a driving force, a migration velocity of the first clamping body 21 or the second clamping body 22, a load weight of the first driving rod 31 or the second driving rod 32.

Each of the plurality of through holes 11 axially extends and is transverse to the first direction L1. The plurality of through holes 11 are respectively at least partially disposed at corners of the slide groove 12, the first clamping body 21 includes at least one first engaging portion 211, the second clamping body 22 includes at least one second engaging portion 221; wherein when the first clamping body 21 and the second clamping body 22 are respectively located in the locking position, the at least one first engaging portion 211 and the at least one second engaging portion 221 each is disposed through one of the plurality of through holes 11 and engaged within a groove 41 of one of the plurality of positioning pins 40 which is disposed through one of the plurality of the through hole 11. When the first clamping body 21 and the second clamping body 22 are respectively located in the release position, the at least one first engaging portion 211 and the at least one second engaging portion 221 each is disengaged from the groove 41 of one of the plurality of positioning pins 40. In the embodiment, the first clamping body 21 includes two said first engaging portions 211 at two opposite corners thereof, and the two first engaging portions 211 are respectively disposed on a side of the first clamping body 21 away from the first bevel gear 312 in the first direction L1, and the two said first engaging portions 211 are separately arranged in a direction which is transverse to the first direction L1.

The second clamping body 22 includes two said second engaging portion 221 formed at two opposite corners thereof, and the two first engaging portions 221 are respectively disposed on a side of the second clamping body 21 away from the second bevel gear 322 in the first direction L1, and the two said second engaging portions 221 are separately arranged in a direction which is transverse to the first direction L1. Therefore, each of the two first engaging portions 211 and each of the two second engaging portions 221 each is engaged within the groove 41 of one of the plurality of positioning pins 40 and abutted against one of the plurality of positioning pins 40 in a direction which is oblique to the first direction L1, so as to stably lock the plurality of positioning pins 40. Moreover, the first clamping body 21 the second clamping body 22 each can be engaged with the plurality of positioning pins 40.

The at least one first engaging portion 211 and the at least one second engaging portion 221 each has an arcuate face 23 facing one of the plurality of through holes 11. The at least one first engaging portion 211 and the at least one second engaging portion 221 each is wedge-shaped and includes a first inclined face 24 and a second inclined face 25, the arcuate face 23 is disposed between the first inclined face 24 and the second inclined face 25, and the first inclined face 24 and the second inclined face 25 are respectively gradually close to each other toward the arcuate face 23. In this embodiment, the first inclined face 24 and the second inclined face 25 are respectively concave arc shaped. Specifically, the first inclined face 24 and the second inclined face 25 are respectively abuttable against two inclined walls 43, the two inclined walls are disposed on the two opposite sides of the groove 41 and arranged in a direction which is transverse to the first direction. The arcuate face 23 corresponds to (or is abutted against) a circumferential bottom surface 42 of groove 41. Therefore, it can be tightly engaged with different sizes of the plurality of positioning pins 40. For example, the different sizes of the positioning pins 40 have said grooves that have different depths, heights, or curvatures.

The first bevel gear 312 and the second bevel gear 322 are disposed separately in the first direction L1, and the third bevel gear 331 of the at least one rotation rod 33 is meshed between the first bevel gear 312 and the second bevel gear 322. Preferably, the adjustment assembly 30 includes a plurality of said rotation rod 33, and said third bevel gears 331 of the plurality of rotation rods 33 are meshed between the first bevel gear 312 and the second bevel gear 322 on different sides (on opposite two sides) of the first bevel gear 312 and the second bevel gear 322.

At least two said rotation rods 33 are coaxial with each other in a direction which is transverse to the first direction L1; the first driving rod 31 is coaxial with the second driving rod 32 in the first direction L1. Therefore, it can be selected from different sides of the base seat 10 to adjust one of the at least two rotation rod 33 to stably rotate the first bevel gear 312 and the second bevel gear 322 without swaying.

The base seat 10 further includes a first axial hole 13 and a blocking member 14. The first axial hole 13 is communicated with the slide groove 12. The adjustment assembly 30 further includes a shaft member 34. The shaft member 34 is disposed through the first axial hole 13 and at least one of the first driving rod 31 and the second driving rod 32, and at least one of the first driving rod 31 and the second driving rod 32 is rotatable relative to the shaft member 34, the blocking member 14 is covered the first axial hole 13. In this embodiment, the blocking member 14 is a set screw which is screwed in the first axial hole 13, so that it is easy to open or close the first axial hole 13. Preferably, the base seat 10 further includes a second axial hole 16; the second axial hole 16 and the first axial hole 13 are coaxial with each other and respectively disposed at two opposite sides of the slide groove 12. The shaft member 34 is disposed through the first driving rod 31, and the second driving rod 32 and the second axial hole 16; thus, the first driving rod 31 and the second driving rod 32 are coaxial to each other and are respectively stably rotated.

The positioning device further includes at least one positioning assembly 60. The base seat 10 further includes at least one receiving hole 15 which extends in a second direction L2, each of the at least one receiving hole 15 is communicated with the slide groove 12, and the second direction L2 is transverse to the first direction L1. The at least one rotation rod 33 is rotatably disposed through the at least one receiving hole 15, each of the at least one positioning assembly 60 includes a position restriction 61 and a washer 62, the at least one position restriction 61 is disengageably disposed within an end portion of the at least one receiving hole 15 which is disposed away the slide groove 12. The at least one rotation rod 33 is blocked by the at least one position restriction 61 in the second direction L2. The washer 62 is abutted between the position restriction 61 and the rotation rod 33. In this embodiment, the position restriction 61 is a retaining ring, the at least one rotation rod 33 has an end portion which corresponds the position restriction 61, and the end portion has a connection portion 332. The connection portion 332 is adapted for being connected with a tool. In this embodiment, the connection portion 332 is a polygonal hole. Specifically, the tool can be disposed through the washer 62 and retaining ring to connect with the polygonal hole. Besides, the base seat 10 includes two said receiving hole 15. The two receiving holes 15 are separate in the second direction L2, and each of the plurality of rotation rods 33 is disposed through one of the two receiving holes 15. Thus, each of the plurality of rotation rods 33 can be blocked by the position restriction 61 and cannot be moved away from the third bevel gear 331 in the second direction L2. As a result, each of the plurality of rotation rods 33 is stably meshed with the first driving rod 31 and the second driving rod 32. The retaining ring can be sprung open or sprung back into shape.

In this embodiment, an outer diameter of the first bevel gear 312 is greater than an outer diameter of the first thread section 311. The first bevel gear 312 and the first thread section 311 are arranged in a first central axis A1. The first bevel gear 312 includes a bottom portion 313 disposed in the first central axis A1 and a plurality of first tooth portions 314, and the plurality of first tooth portions 314 are circumferentially disposed on the bottom portion 313 and disposed around the first central axis A1. Moreover, the plurality of first tooth portions 314 are axially protruded from the bottom portion 313. The plurality of first tooth portions 314 and the bottom portion 313 are defined a cavity 315, and each of the plurality of first tooth portions 314 includes a first conical face 316, a second conical face 317, two inclined abutting faces 318 and an outer tooth face 319. The first conical face 316 is radially gradually tapered toward the cavity 315, the second conical face 317 is axially gradually tapered toward the bottom portion 313, and the first conical face 316 is transverse to the second conical face 317. The outer tooth face 319 and the second conical face 317 are radially disposed on two opposite sides of one said first tooth portion 314, and the outer tooth face 319 is far away from the cavity 315. The outer tooth face 319 is axially gradually tapered from the bottom portion 313. The two inclined abutting faces 318 are circumferentially disposed on two opposite sides of the first conical face 316, and each of the two inclined abutting face 318 is disposed between the first conical face 316, the second conical face 317 and the outer tooth face 319. The second driving rod 32 is the same structure as the first driving rod 31. Each of the plurality of rotation rods 33 defines a second central axis A2 and includes a plurality of second tooth portions 35 disposed around the second central axis A2. Each of plurality of second tooth portions 35 includes an inclined tooth face 351, two abutting faces 352, an extending face 353 and an end face 354 which radially extends. The inclined tooth face 351 is disposed between the end face 354 and the extending face 353. The extending face 353 is axially tapered toward the inclined tooth face 351. The inclined tooth face 351 is a quadrilateral. The inclined tooth face 351 is tapered from the extending face 353 to the end face 354 and gradually close to the second central axis A2. The two abutting faces 352 are circumferentially connected with two opposite sides of the extending face 353, and each of the two abutting faces 352 is disposed between the inclined tooth face 351 and the end face 354. One of the two abutting faces 352 is circumferentially abutted against one of the two inclined abutting faces 318 of one of the plurality of first tooth portions 314. Thus, the first driving rod 31 and the second driving rod 32 can be easy rotated by each of the plurality of rotation rods 33. The first central axis A1 is intersected to the second central axis A2. In another embodiment, each first tooth portion and each second tooth portion are respectively V-shaped or trapezoid-shaped.

An end portion of the first driving rod 31 and an end portion of the second driving rod 32 which are disposed away from each other and abutted against a wall of the slide groove 12, so that it can prevent the first driving rod 31 and the second driving rod 32 from being moved away from each other when the first driving rod 31 and the second driving rod 32 are respectively rotated by the at least one rotation rod 33.

The positioning device further includes a plurality of positioning rings 50, and the plurality of positioning rings 50 are respectively disposed within the plurality of through holes 11. A circumferential wall 52 of each of the plurality of the positioning rings 50 has a via hole 51. The via hole 51 is communicated with one of the plurality of through holes 11 and the slide groove 12. The at least one first engaging portion 211 and the second engaging portion 221 each is disposed through one said via hole 51 of one of the plurality of positioning rings 50. Specifically, each of the positioning ring 50 is harder than the base seat 10, and each of the plurality of the positioning ring 50 can be made of metal material or plastic material; thus, it can prevent the base seat 10 from being worn. Besides, each of the plurality of the positioning ring 50 is disengageably disposed within one of the plurality of through holes 11.

In use, the at least one rotation rod 33 is rotated to rotate the first driving rod 31 and the second driving rod 32, so that the first clamping body 21 and the second clamping body 22 can be moved relative to each other to lock or release the plurality of positioning pins 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A positioning device, being adapted for removably positioning a tooling fixture, the positioning device including:
   a base seat, including a plurality of through holes and a slide groove which extends in a first direction, the plurality of through holes being configured to receive a plurality of positioning pins which are connected with the tooling fixture;
   a clamping assembly, disposed within the slide groove, including a first clamping body and a second clamping body, the first clamping body and the second clamping body being respectively movable relative to each other and relative to at least one said through hole between a locking position and a release position in the first direction; and
   an adjustment assembly, including a first driving rod, a second driving rod and at least one rotation rod, the at least one rotation rod rotatably disposed within the base seat, the first driving rod and the second driving rod respectively rotatably disposed within the slide groove, the first driving rod including a first thread section and a first bevel gear connected with the first thread section, the second driving rod including a second thread section and a second bevel gear connected with the second thread section, the first clamping body screwed to the first thread section and the second clamping body screwed to the second thread section, each of the at least one rotation rod including a third bevel gear, the third bevel gear meshed with the first bevel gear and the second bevel gear, so that the first driving rod and the second driving rod are respectively rotated by the at least one rotation rod, wherein the first clamping body includes at least one first engaging portion, the second clamping body includes at least one second engaging portion: when the first clamping body and the second clamping body are respectively located in the locking position, the at least one first engaging portion and the at least one second engaging portion each is disposed through one of the plurality of through holes and engaged within a groove of one of the plurality of positioning pins.

2. The positioning device of claim 1, wherein the first bevel gear and the second bevel gear are disposed separately in the first direction, and the third bevel gear of the at least one rotation rod is meshed between the first bevel gear and the second bevel gear.

3. The positioning device of claim 2, wherein the adjustment assembly includes a plurality of said rotation rods, and said third bevel gears of the plurality of rotation rods are meshed between the first bevel gear and the second bevel gear on different sides of the first bevel gear and the second bevel gear.

4. The positioning device of claim 1, wherein each of the plurality of through holes axially extends and is transverse to the first direction, the plurality of through holes are respectively at least partially disposed at corners of the slide groove; when the first clamping body and the second clamping body are respectively located in the release position, the at least one first engaging portion and the at least one second engaging portion each is disengaged from the groove of one of the plurality of positioning pins.

5. The positioning device of claim 4, wherein the at least one first engaging portion and the at least one second engaging portion each has an arcuate face facing one of the plurality of through holes.

6. The positioning device of claim 5, wherein the at least one first engaging portion and the at least one second engaging portion each is wedge-shaped and includes a first inclined face and a second inclined face, the arcuate face is disposed between the first inclined face and the second inclined face, and the first inclined face and the second inclined face are respectively gradually close to each other toward the arcuate face.

7. The positioning device of claim 4, further including a plurality of positioning rings, the plurality of positioning rings respectively disposed within the plurality of through holes, a circumferential wall of each of the plurality of the positioning rings having a via hole, the via hole communicated with one of the plurality of through holes and the slide groove, and the at least one first engaging portion and the second engaging portion each disposed through one said via hole of one of the plurality of positioning rings.

8. The positioning device of claim 1, wherein the base seat further includes a first axial hole and a blocking member, the first axial hole is communicated with the slide groove, the adjustment assembly further includes a shaft member, the shaft member is disposed through the first axial hole and at least one of the first driving rod and the second driving rod, and at least one of the first driving rod and the second driving rod is rotatable relative to the shaft member, and the blocking member is covered the first axial hole.

9. The positioning device of claim 1, further including at least one positioning assembly, the base seat further including at least one receiving hole which extends in a second direction, each of the at least one receiving hole communicated with the slide groove, the second direction being transverse to the first direction, the at least one rotation rod rotatably disposed through the at least one receiving hole, each of the at least one positioning assembly including a position restriction and a washer, the at least one position restriction disengageably disposed within an end portion of the at least one receiving hole which is disposed away the slide groove, the at least one rotation rod being blocked by the at least one position restriction in the second direction, and the washer abutted between the position restriction and the at least one rotation rod.

10. The positioning device of claim 5, wherein the first clamping body includes two said first engaging portions formed at two opposite corners thereof, and the two first engaging portions are respectively disposed on a side of the first clamping body away from the first bevel gear in the first direction, and the two said first engaging portions are separately arranged in a direction which is transverse to the first direction; the second clamping body includes two said second engaging portions formed at two opposite corners thereof, and the two first engaging portions are respectively disposed on a side of the second clamping body away from the second bevel gear in the first direction, and the two said second engaging portions are separately arranged in a direction which is transverse to the first direction; a thread of the first thread section and a thread of the second thread section are respectively formed in opposite helical directions; the first bevel gear and the second bevel gear are disposed separately in the first direction, and the third bevel gear of the at least one rotation rod is meshed between the first bevel gear and the second bevel gear; the adjustment assembly including a plurality of said rotation rods, said third bevel gears of the plurality of rotation rods are meshed between the first bevel gear and the second bevel gear on opposite two sides of the first bevel gear and the second bevel gear; at least two said rotation rods are coaxial with each other in a direction which is transverse to the first direction, the first driving rod is coaxial with the second driving rod in the first direction; the positioning device further includes a plurality of positioning rings, the plurality of positioning rings are respectively disposed within the plurality of through holes, a circumferential wall of each of the plurality of the positioning rings has a via hole, the via hole is communicated with one of the plurality of through holes and the slide groove, and the at least one first engaging portion and the second engaging portion each is disposed through one said via hole of one of the plurality of positioning rings; the base seat further includes a first axial hole and a blocking member, the first axial hole is communicated with the slide groove, the adjustment assembly further includes a shaft member, the shaft member is disposed through the first axial hole and at least one of the first driving rod and the second driving rod, and at least one of the first driving rod and the second driving rod is rotatable relative to the shaft member, the blocking member is covered the first axial hole; the base seat further includes a second axial hole, the second axial hole and the first axial hole are coaxial with each other and respectively disposed at two opposite sides of the slide groove, and the shaft member is disposed through the first driving rod, the second driving rod and the second axial hole; the positioning device further includes at least one positioning assembly, the base seat further includes at least one receiving hole which extends in a second direction, each of the at least one receiving hole is communicated with the slide groove, the second direction is transverse to the first direction, the at least one rotation rod rotatably disposed through the at least one receiving hole, each of the at least one positioning assembly includes a position restriction and a washer, the at least one position restriction is disengageably disposed within an end portion of the at least one receiving hole which is disposed away the slide groove, the at least one rotation rod is blocked by the at least one position restriction in the second direction, and the washer abutted between the position restriction and the at least one rotation rod; the position restriction is a retaining ring, the at least one rotation rod has an end portion which corresponds the position restriction, the end portion has a connection portion, the connection portion is adapted for being connected with a tool; the base seat includes two said receiving holes, the two receiving holes are separate in the second direction, each of the plurality of rotation rods disposed through one of the two receiving holes.

\* \* \* \* \*